(12) United States Patent
Simpson et al.

(10) Patent No.: US 10,430,127 B2
(45) Date of Patent: Oct. 1, 2019

(54) DETERMINATIONS OF PREVIOUS INSTALLATIONS OF MARKING AGENT CARTRIDGES WITHIN PRINTER FLEETS

(71) Applicant: Hewlett-Packard Development Company, L.P., Houston, TX (US)

(72) Inventors: Shell S Simpson, Boise, ID (US); Timothy P Blair, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/757,053

(22) PCT Filed: Nov. 5, 2015

(86) PCT No.: PCT/US2015/059313
§ 371 (c)(1),
(2) Date: Mar. 2, 2018

(87) PCT Pub. No.: WO2017/078722
PCT Pub. Date: May 11, 2017

(65) Prior Publication Data
US 2018/0246685 A1   Aug. 30, 2018

(51) Int. Cl.
*B41J 2/195*   (2006.01)
*G06F 3/12*   (2006.01)
(Continued)

(52) U.S. Cl.
CPC ........ *G06F 3/1218* (2013.01); *B41J 2/17546* (2013.01); *B41J 2/17566* (2013.01); *G03G 15/5079* (2013.01); *G03G 15/55* (2013.01); *G03G 15/556* (2013.01); *G06F 3/1229* (2013.01); *G06F 3/1285* (2013.01); *G06Q 30/01* (2013.01); *G03G 2215/00109* (2013.01)

(58) Field of Classification Search
USPC ................................................ 347/7; 399/12
See application file for complete search history.

(56) References Cited

U.S. PATENT DOCUMENTS

| 6,158,837 A | 12/2000 | Hilton et al. |
| 6,588,871 B2 | 7/2003 | Studholme et al. |

(Continued)

FOREIGN PATENT DOCUMENTS

WO   WO-2006066270 A2   6/2006

OTHER PUBLICATIONS

PC WORLD Article, EPSON: Bisontec Epson Chip Resetter for Epson Cartridges with Chip~Jul. 22, 2015~2 pages.
(Continued)

*Primary Examiner* — Lam S Nguyen
(74) *Attorney, Agent, or Firm* — HP Inc. Patent Department (57) ABSTRACT

In one example of the disclosure, for each of a plurality of printers of a printer fleet, identification data indicative of marking agent cartridges installed is obtained via a network. The identification data is caused to be stored in association with a fleet identifier for the printer fleet. A request for fleet installation information with respect to a first marking agent cartridge is received from a computing device. It is determined, based upon the identification data, whether a first marking agent cartridge was previously installed at a printer of the printer fleet. Determination data indicative of the determination is sent to the computing device.

15 Claims, 7 Drawing Sheets

(51) Int. Cl.
*B41J 2/175* (2006.01)
*G03G 15/00* (2006.01)
*G06Q 30/00* (2012.01)

(56) References Cited

U.S. PATENT DOCUMENTS

| | | |
|---|---|---|
| 6,935,713 B2 | 8/2005 | Phillips |
| 6,969,136 B1 | 11/2005 | Matsumoto et al. |
| 8,602,536 B1 | 12/2013 | Sarnoff et al. |
| 2005/0078165 A1 | 4/2005 | Harada et al. |
| 2005/0219284 A1 | 10/2005 | Shima |
| 2005/0226642 A1 | 10/2005 | rodriguez et al. |
| 2006/0140647 A1 | 6/2006 | Adkins |
| 2008/0133384 A1 | 6/2008 | Nagata |
| 2009/0153602 A1 | 6/2009 | Brown et al. |
| 2011/0254907 A1 | 10/2011 | Jeon |
| 2012/0224216 A1 | 9/2012 | Wong et al. |
| 2014/0002537 A1 | 1/2014 | Thacker et al. |
| 2014/0023382 A1 | 1/2014 | Kawana et al. |
| 2014/0225946 A1 | 8/2014 | Quinn et al. |
| 2014/0270813 A1 | 9/2014 | Ignatchenko et al. |

OTHER PUBLICATIONS re-inks Blog. Changing or Resetting Chips Make Canon Ink Refills Easy. Apr. 23, 2012~2 pages.
Webpage. Chip resetter designed specifically for Brother lc103/lc105/lc107 cartridges~Jul. 22, 2015~2 pages.
Webpage. Unk-Kit Chip Resetter for Epson V9.0~Jul. 7, 2015~1 page.

DETERMINATIONS OF PREVIOUS INSTALLATIONS OF MARKING AGENT CARTRIDGES WITHIN PRINTER FLEETS

BACKGROUND

Many printers utilize replaceable cartridges with a reservoir or reservoirs holding marking agent. In many cases such a marking agent cartridge will include an integrated circuit, e.g., a microchip. In this manner, a printer can send electronic signals to the marking agent cartridge to obtain information regarding the cartridge such as seller/provider, model number, and amount of marking agent remaining. When a user discovers a marking agent cartridge has reached its end of life, the user may dispose of the cartridge in a solid waste stream or provide the cartridge to a third party for recycling.

DETAILED DESCRIPTION

Introduction: Some cartridges that are intended to be disposed of or recycled may find their way to being remanufactured by an entity other than the original producer of the cartridge. Such remanufacturers may add marking agent to reservoirs and perhaps replace some components, but commonly the chip on the cartridge is not replaced. Accordingly, when these remanufactured cartridges are re-sold, the chip on the cartridge may reflect a low marking agent level or other cartridge life information that is not applicable for the remanufactured cartridge.

To prevent printer users from seeing incorrect cartridge life information, a printer provider may configure a printer to identify a marking agent cartridge as a remanufactured cartridge in situations where a the cartridge has not been previously installed at the printer, yet the cartridge's chip indicates the marking agent is at a low level relative to a new marking agent cartridge. Such identification can also be useful for providing a message to a user that an installed marking agent cartridge is a remanufactured cartridge and reduced print quality relative to a new cartridge may occur.

However, in some instances a user may move a marking agent cartridge from one printer to another printer. This may occur when a broken printer is replaced with a working printer. Since the cartridge from the broken printer still works, the user installs the cartridge in the working printer. However, if the chip of the moved marking agent cartridge indicates the cartridge has reached a low level, the new printer may incorrectly identify that reinstalled cartridge as a remanufactured cartridge. To address these issues, various examples described in more detail below provide a system and a method for determining a previous installation of a marking agent cartridges within a printer fleet. Examples provided herein may thereby prevent a marking agent cartridge that is moved from one printer in a fleet to another printer in the fleet from being identified as a remanufactured cartridge by determining whether the cartridge has been installed in any printer in the fleet before reporting that the cartridge is remanufactured. In an example, identification data is obtained via a network for each of a set of printers of a printer fleet. The identification data is data indicative of marking agent cartridges installed at the set of printers. The identification data is caused to be stored in association with a fleet identifier for the printer fleet. A request for fleet installation information with respect to a first marking agent cartridge is received from a computing device. A determination as to whether a first marking agent cartridge was previously installed at a printer of the printer fleet is made based upon the identification data. Determination data indicative of the determination is in turn sent to the computing device.

In certain examples, it may be determined that the first marking agent cartridge was previously installed in a first printer of the fleet, and the determination data is provided to the computing device to override a prior determination by the computing device that the marking agent cartridge is a remanufactured marking agent cartridge. In other examples, it may be determined that the first marking agent cartridge was not previously installed in a first printer of the fleet, and the determination data is provided to the computing device to confirm a determination by the computing device that the marking agent cartridge is a remanufactured marking agent cartridge. In certain examples the computing device that receives the determination data is a second printer at which the marking agent cartridge is being reinstalled. In other examples, the computing device is a host computing device for a second printer at which the marking agent cartridge is being reinstalled, wherein the second printer is connected to the host computing device via a USB or other wired connection.

In this manner, the disclosed examples provide for an efficient and easy to use method and system to prevent cartridges that are moved between printers in a customer's fleet from being mistakenly identified as remanufactured. This can be particularly useful in break-fix scenarios where one printer may be replaced with another printer. Enterprise users and end users of printers and marking agent cartridges should each appreciate the reduced costs, time savings, and positive environmental impacts to be enjoyed with utilization of the disclosed examples.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of reporting computer resource accesses. The fourth section, labeled "Operation," describes implementation of various examples.

Figure 1:
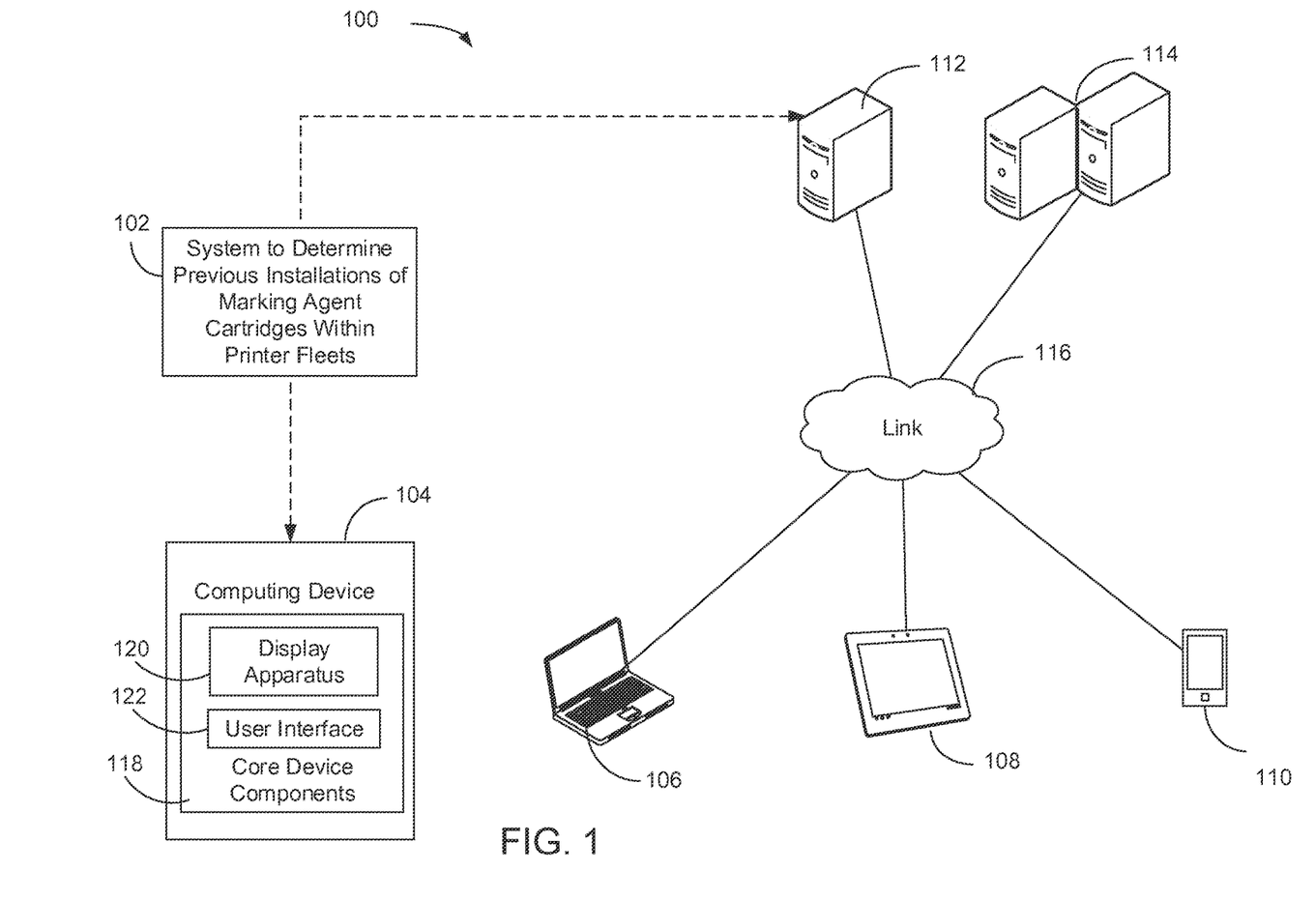
FIG. 1 is a block diagram depicting an example environment in which various examples of the disclosure may be implemented.

Environment: FIG. 1 depicts an example environment 100 in which examples may be implemented as a system 102 for determining previous installations of marking agent cartridges at a printer of a printer fleet. Environment 100 is shown to include computing device 104, client devices 106, 108, and 110, server device 112, and server devices 114. Components 104-114 are interconnected via link 116.

Link 116 represents generally any infrastructure or combination of infrastructures to enable an electronic connection, wireless connection, other connection, or combination thereof, to enable data communication between components 104-114. Such infrastructure or infrastructures may include, but are not limited to, a cable, wireless, fiber optic, or remote connections via telecommunication link, an infrared link, or a radio frequency link. For example, link 116 may represent the internet, intranets, and any intermediate routers, switches, and other interfaces. As used herein, a "computing device" may be a server, computer networking device, chip set, desktop computer, notebook computer, workstation, tablet computer, smartphone or any other processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally any computing device with which a user may interact to communicate with other client devices, server device 112, and/or server devices 114 via link 116. Server device 112 represents generally any computing device to serve an application and corresponding data for consumption by components 104-110 and 114. Server devices 114 represent generally a group of computing devices collectively to serve an application and corresponding data for consumption by components 104-110 and 112.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming to determine previous installations of marking agent cartridges at a printer of a printer fleet. In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114.

Figure 2A:
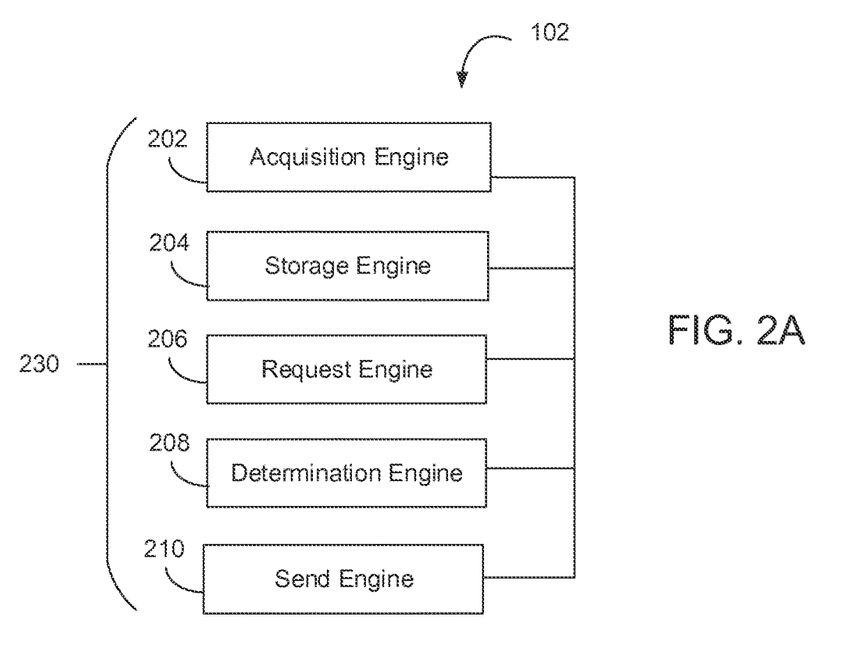
FIGS. 2A and 2B are block diagrams depicting examples of a system to determine previous installations of marking agent cartridges at a printer of a printer fleet.
Figure 2B:
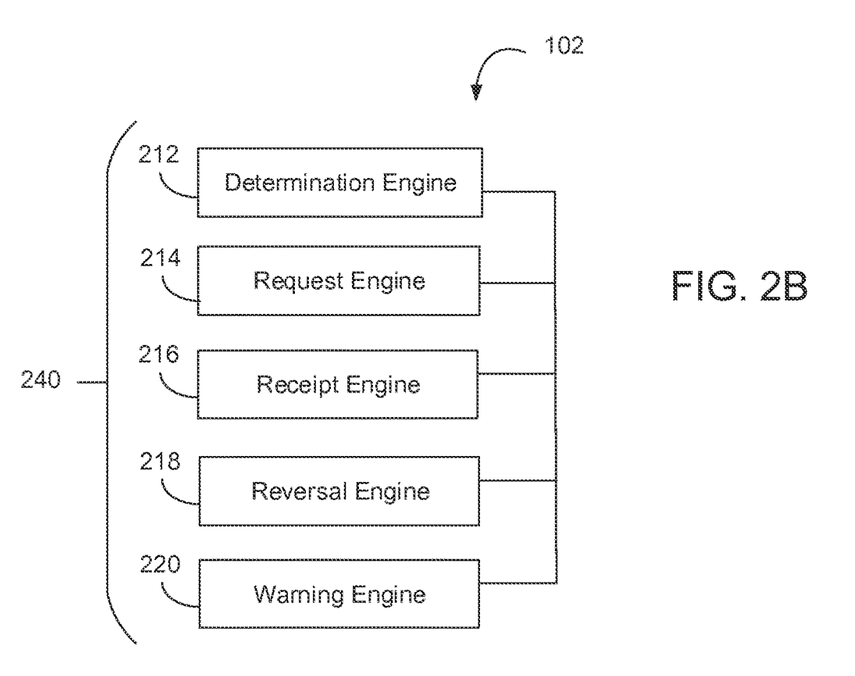

Components: FIGS. 2A, 2B, 3A and 3B depict examples of physical and logical components for implementing various examples. In FIGS. 2A and 2B various components are identified as engines 202, 204, 206, 208, 210, 212, 214, 216, 218, and 220. In describing engines 202-220 focus is on each engine's designated function. However, the term engine, as used herein, refers generally to a combination of hardware and programming to perform a designated function. As is illustrated later with respect to FIGS. 3A and 3B, the hardware of each engine, for example, may include one or both of a processor and a memory, while the programming may be code stored on that memory and executable by the processor to perform the designated function.

FIG. 2A is a block diagram depicting components of a system 102 to enable determination of previous installations of marking agent cartridges at a printer of a printer fleet. In this example, system 102 includes acquisition engine 202, storage engine 204, request engine 206, determination engine 208, and send engine 210. In performing their respective functions, engines 202-210 may access a data repository, e.g., any memory accessible to system 102 that can be used to store and retrieve data.

In an example, acquisition engine 202 represents generally a combination of hardware and programming to obtain, for each of a set of printers of a printer fleet, identification data indicative of marking agent cartridges installed at the printers. In examples, the identification data is obtained via a network, e.g., link 116 (FIG. 1). As used herein, a "printer" is synonymous with a "printing device", and refers generally to any electronic device or group of electronic devices that consume a marking agent to produce a printed print job or printed content. In examples, a printer may be, but is not limited to, a liquid inkjet printer, a solid toner-based printer, a liquid toner-based printer, or a multifunctional device that performs a function such as scanning and/or copying in addition to printing. In certain examples, a "printer" may be a 3D printer. In certain examples, the printed print job or printed content may be a 3D rendering created by a 3D printer printing upon a bed of marking agent or other build material. As used herein, a "print job" refers generally to content, e.g., an image, and/or instructions as to formatting and presentation of the content sent to a computer system for printing. In examples, a print job may be stored in a programming language and/or a numerical form so that the job can be stored and used in computing devices, servers, printers and other machines capable of performing calculations and manipulating data. As used herein, an "image" refers generally to a rendering of an object, scene, person, or abstraction such text or a geometric shape. As used herein a "printer fleet" or "fleet" refers generally to a set of printers that are operated together or are owned, leased, licensed, accessed, or controlled by a common entity. In a particular example, a printer fleet may be a set of printers accessed by employees and contractors of an entity that is a customer to a managed print service.

As used herein a "marking agent" refers generally to any substance that can be applied upon a print target by a printer during a printing operation, including but not limited to aqueous inks, solvent inks, UV-curable inks, dye sublimation inks, latex inks, liquid electrophotographic inks, liquid or solid toners, and powders. In an example, a print target may be a media. In another example, such as in some 3D printing applications, a print target may be a bed of marking agent or other build material. An "ink" refers generally to any fluid that is to be applied to a print target during a printing operation. As used herein a "marking agent cartridge" refers generally to any container that holds or is to hold a quantity of marking agent and that is designed for insertion into a printer.

In one example, printers of the printer fleet may be directly connected to the network (e.g., link 116), such that acquisition engine 202 may obtain identification data, indicative of marking agent cartridges installed at such printers, directly from such printers. In another example, acquisition engine 202 may obtain identification data, indicative of marking agent cartridges installed at a printer from a host computing device, wherein such host computing device is connected to via a USB connection or other wired electronic connection. As used herein, a "host computing device" with respect to a printer refers generally to a computing device that is electronically connected to the printer and includes a print driver for the printer. In a particular example, a host computing device that is connected to a printer of the fleet may include an agent component for acquisition engine 202, wherein the agent component is or includes programming to facilitate communication of identification data regarding use of marking agent cartridges at the printer from the host computing device to acquisition engine 202.

Storage engine 204 represents generally a combination of hardware and programming to cause storage of the identification data in association with a fleet identifier for the printer fleet. In an example, storage engine 204 may cause the obtained identification data to be stored in association with a fleet identifier for the printer fleet in a document that includes identification data exclusive to a specific printer fleet. In an example, the stored fleet identifier may include an identification of a common owner of the printers of the fleet. In another example, the stored fleet identifier may include an identification of a common lessee of the printers of the fleet. In another example, the stored fleet identifier may include an identification of a common customer (e.g., a customer of a managed print services provider) that is utilizing the printers of the printer fleet. As used herein, a "document" refers generally to an electronic collection of data that provides information or evidence, or that serves as an electronic record, the collection being in a format that can be interpreted by a computer or other electronic device to display, interpret, and process the data. In examples a document may include an electronic file generated by a software and stored on magnetic media (disks) or optical media (CDs, DVDs), as well as electronic mail and documents transmitted in electronic data interchange (EDI).

In another example, storage engine 204 may cause the obtained identification data to be stored in association with a fleet identifier for a subject printer fleet in a database, the database including identification data for a plurality of printer fleets that includes the subject printer fleet. As used herein, a "database" refers generally to any organized collection of data in digital form such that it can be stored in computer memory or a data storage device.

Continuing with the example of FIG. 2A, request engine 206 represents generally a combination of hardware and programming to receive, from a requestor computing device, a request for fleet installation information with respect to a first marking agent cartridge. In an example, the request may be received from a requestor computing device that is printer that is a part of the printer fleet.

Determination engine 208 represents generally a combination of hardware and programming to determine, based upon the obtained identification data, whether a first marking agent cartridge was previously installed at a printer of the printer fleet. Send engine 210 represents generally a combination of hardware and programming to send to the requestor computing device determination data indicative of the determination.

In one example, if determination engine 208 determines that the first marking agent cartridge was previously installed in a printer of the fleet, send engine 210 may provide the determination data to the requestor computing device to override a prior determination by the requestor computing device that the marking agent cartridge was a remanufactured marking agent cartridge. In this manner, system 102 prevents a marking agent cartridge that was moved between printers of the printer fleet from being mistakenly identified as a remanufactured cartridge.

In another example, if determination engine 208 determines that the first marking agent cartridge was not previously installed in a printer of the printer fleet, send engine 210 may provide the determination data to the requestor computing device to confirm a prior determination by the requestor computing device that the marking agent cartridge is a remanufactured marking agent cartridge.

In examples, acquisition engine 202, storage engine 204, request engine 206, determination engine 208, and send engine 210 may be included within a cloud computing device that is connected to the requestor computing device via a network, e.g., an internet. In other examples, acquisition engine 202, storage engine 204, request engine 206, determination engine 208, and send engine 210 may be included within a print server device that is part of a network that includes the requestor computing device, but where the network is not an internet.

In examples, acquisition engine 202 may obtain the identification data from the printers of the fleet and/or host computing devices for the printers of the fleet, storage engine 204 may cause storage of the identification data, request engine 206 may receive the request for fleet installation information, and send engine 210 may send the determination data to the requestor computing device over a link 116 via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

FIG. 2B is a block diagram depicting components of a system 102 to determine previous installations of marking agent cartridges at a printer of a printer fleet. In this example, system 102 includes determination engine 212, request engine 214, receipt engine 216, reversal engine 218, and warning engine 220. In performing their respective functions, engines 212-220 may access a data repository, e.g., any memory accessible to system 102 that can be used to store and retrieve data. In examples, engines 212-220 may be included within a printer that is connected to a server via a network, e.g., an internet. In other examples, engines 212-220 may be included within a host computing device that is to have a wired (e.g., a USB hub) connection to a printer, wherein the host computing device is electronically connected to a server via the network.

In an example, determination engine 212 represents generally a combination of hardware and programming to make a first determination, by accessing a list of marking agent cartridges known to have been previously used or to have been remanufactured, that a first marking agent cartridge installed at a printer is a remanufactured cartridge.

Request engine 214 represents generally a combination of hardware and programming to send to a server via a network a request for fleet installation information with respect to a first marking agent cartridge.

Continuing with the example of FIG. 2B, receipt engine 216 represents generally a combination of hardware and programming to receive from the server fleet data indicative of a second determination, made at the server based upon the an assessment of usage of the marking agent cartridge within a printer fleet, of whether the first marking agent cartridge was previously installed at a printer of the printer fleet.

Reversal engine 218 represents generally a combination of hardware and programming to reverse the first determination responsive to receipt of fleet data indicative that first marking agent cartridge was previously installed at a printer of the printer fleet. In a particular example, receipt of the fleet data at the computing device may cause cancellation of a marking agent cartridge warning that otherwise would have been caused to be displayed for user viewing. In one instance, the cancelled warning may be a warning stating that the marking agent cartridge is a remanufactured cartridge. In another instance, the cancelled warning may be a warning stating that a printer user may experience decreased print quality as a result of installation or use of the first marking agent cartridge. In another instance, the cancelled warning may be a warning indicating a printer user may experience erroneous information regarding remaining marking agent levels as a result of installation or use of the first marking agent cartridge.

Continuing with the example of FIG. 2B, warning engine 220 represents generally a combination of hardware and programming to, responsive to receipt of fleet data indicative that first marking agent cartridge was not previously installed at a printer of the printer fleet, cause provision of a user warning. In a particular example, the user warning may be a warning that the first marking agent cartridge is a remanufactured cartridge. In another particular example, the user warning may be a warning indicating a printer user may experience decreased print quality as a result of installation or use of the first marking agent cartridge. In another particular example, the user warning may be a warning indicating a printer user may experience erroneous information regarding remaining marking agent levels as a result of installation or use of the first marking agent cartridge.

In examples, request engine 214 may send the request for fleet installation information to a server, and receipt engine 216 may receive the fleet data indicative of the second determination from a server over a link 116 via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

With reference back to FIG. 1 in view of FIGS. 2A and 2B, in one example system 102 may include a previous installation determination component 230 that includes engines 202-210 operating on server device 112 (or another device shown or not shown in FIG. 1) and/or a client component 240 that includes engines 212-220 operating on client device 106 (or another device shown or not shown in FIG. 1). In other examples, system 102 may include engines 202-210 and/or engines 212-220 included within, or distributed across, any one or several of computing device 104, client devices 106-110, server device 112, or server devices 114.

In the foregoing discussion of FIGS. 2A and 2B, engines 202-220 were described as combinations of hardware and programming. Engines 202-220 may be implemented in a number of fashions. Looking at FIGS. 3A and 3B the programming may be processor executable instructions stored on a tangible memory resource 330 and the hardware may include a processing resource 340 for executing those instructions. Thus memory resource 330 can be said to store program instructions that when executed by processing resource 340 implement system 102 of FIGS. 2A and 2B.

Figures 3A, 3B:
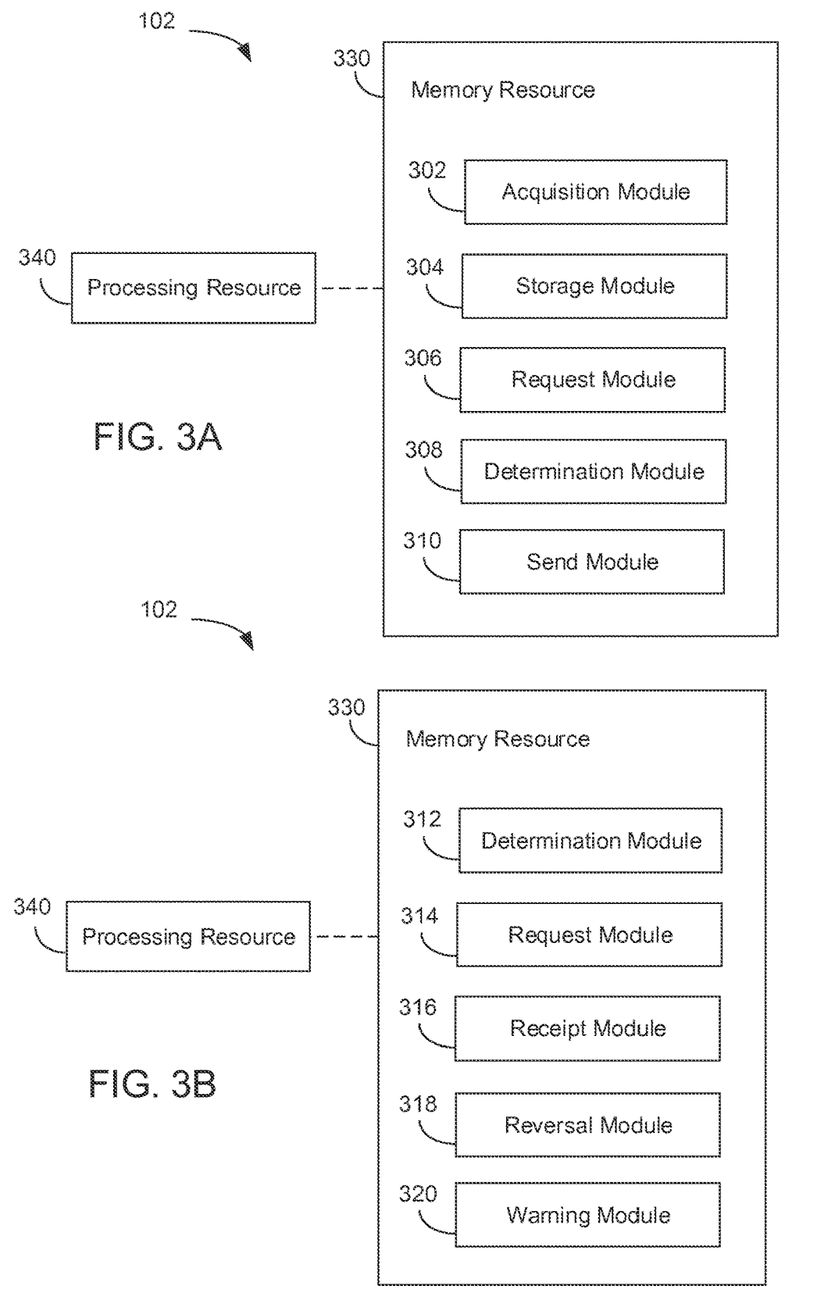
FIGS. 3A and 3B are block diagrams depicting a memory resource and a processing resource to implement examples of a system to determine previous installations of marking agent cartridges at a printer of a printer fleet.

Memory resource 330 represents generally any number of memory components capable of storing instructions that can be executed by processing resource 340. Memory resource 330 is non-transitory in the sense that it does not encompass a transitory signal but instead is made up of more or more memory components to store the relevant instructions. Memory resource 330 may be implemented in a single device or distributed across devices. Likewise, processing resource 340 represents any number of processors capable of executing instructions stored by memory resource 330. Processing resource 340 may be integrated in a single device or distributed across devices. Further, memory resource 330 may be fully or partially integrated in the same device as processing resource 340, or it may be separate but accessible to that device and processing resource 340.

In one example, the program instructions can be part of an installation package that when installed can be executed by processing resource 340 to implement system 102. In this case, memory resource 330 may be a portable medium such as a CD, DVD, or flash drive or a memory maintained by a server from which the installation package can be downloaded and installed. In another example, the program instructions may be part of an application or applications already installed. Here, memory resource 330 can include integrated memory such as a hard drive, solid state drive, or the like.

In FIG. 3A, the executable program instructions stored in memory resource 330 are depicted as acquisition module 302, storage module 304, request module 306, determination module 308, and send module 310. Acquisition module 302 represents program instructions that when executed by processing resource 340 may perform any of the functionalities described above in relation to acquisition engine 202 of FIG. 2A. Storage module 304 represents program instructions that when executed by processing resource 340 may perform any of the functionalities described above in relation to storage engine 204 of FIG. 2A. Request module 306 represents program instructions that when executed by processing resource 340 may perform any of the functionalities described above in relation to request engine 206 of FIG. 2A. Determination module 308 represents program instructions that when executed by processing resource 340 may perform any of the functionalities described above in relation to determination engine 208 of FIG. 2A. Send module 310 represents program instructions that when executed by processing resource 340 may perform any of the functionalities described above in relation to send engine 210 of FIG. 2A.

In FIG. 3B, the executable program instructions stored in memory resource 330 are depicted as determination module 312, request module 314, receipt module 316, reversal module 318, and warning module 320. Determination module 312 represents program instructions that when executed by processing resource 340 may perform any of the functionalities described above in relation to determination engine 212 of FIG. 2B. Request module 314 represents program instructions that when executed by processing resource 340 may perform any of the functionalities described above in relation to request engine 214 of FIG. 2B. Receipt module 316 represents program instructions that when executed by processing resource 340 may perform any of the functionalities described above in relation to receipt engine 216 of FIG. 2B. Reversal module 318 represents program instructions that when executed by processing resource 340 may perform any of the functionalities described above in relation to reversal engine 218 of FIG. 2B. Warning module 320 represents program instructions that when executed by processing resource 340 may perform any of the functionalities described above in relation to warning engine 220 of FIG. 2B.

Figure 4:
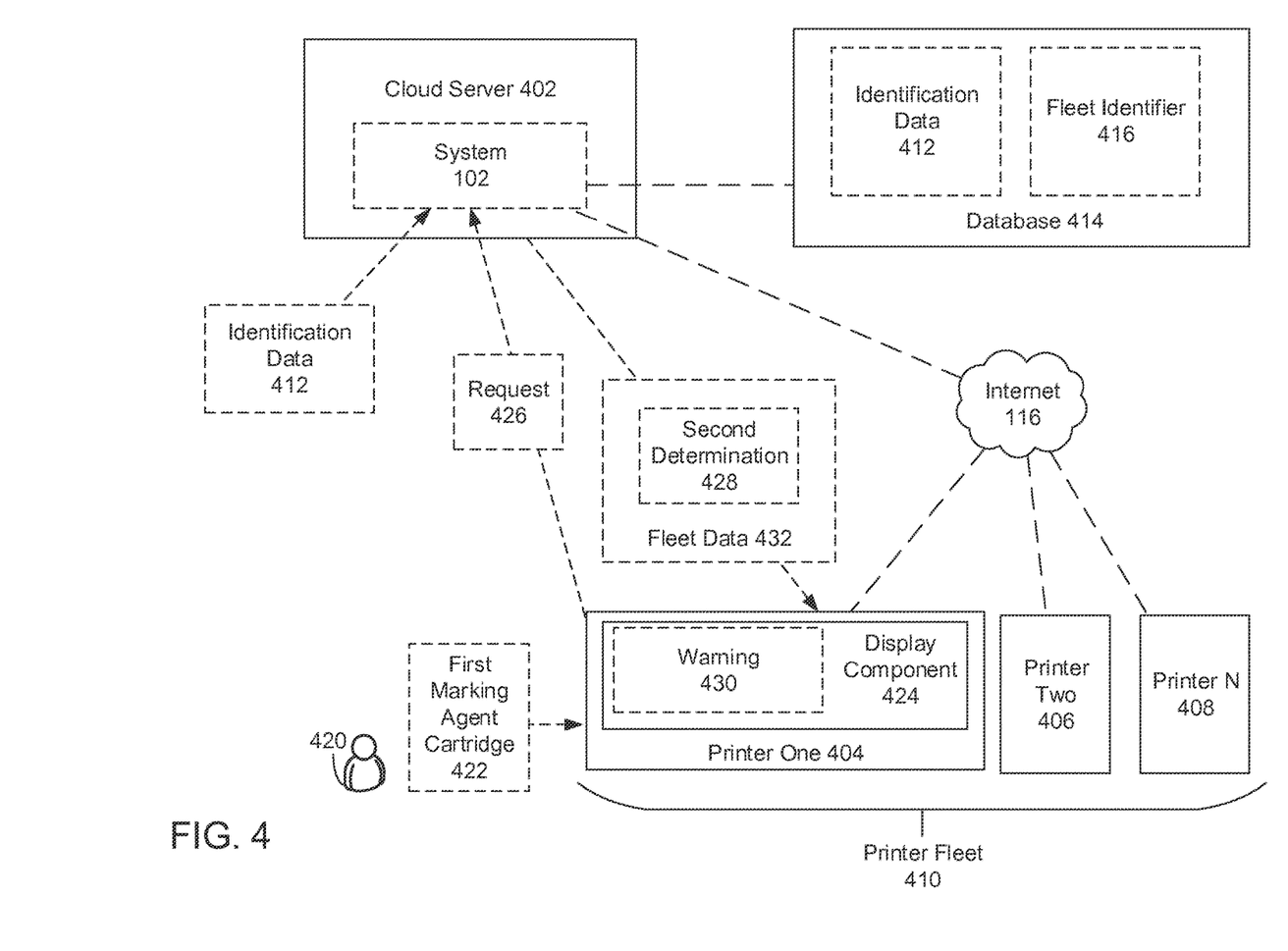
FIG. 4 illustrates an example of a system for determining previous installations of marking agent cartridges at a printer within a printer fleet.

Illustrative Example: FIG. 4, in view of FIGS. 1, 2A, and 2B, illustrates an example of a system 102 for determination of previous installations of marking agent cartridges at a printer of a printer fleet. In examples, system 102 may be hosted at a computing device such as server device 112 (FIG. 1) or distributed over a set of computing devices such as server system 114 (FIG. 1). In the particular example depicted at FIG. 4, system 102 is included within a cloud server 402 that is connected to printer one 404, printer two 406, and printer N 408 of a printer fleet 410 via a network (internet 116). In another example, not depicted at FIG. 4, system 102 may be included within a print server device that is part of a network that is not an internet, wherein the network additionally includes the printer fleet.

In the example of FIG. 4 system 102 receives via internet 116 identification data 412 indicative of marking agent cartridges installed at printers of a printer fleet 410 (printer one 404, printer two 406, and printer N 408). In the depicted example system 102 receives the marking agent cartridge identification data 412 as a result of network connected printer one 404, network connected printer two 406, and network connected printer N 408 having provided the identification data 412 to system 102. In other examples, not depicted at FIG. 4, e.g., wherein a printer is not directly connected to a network, system 102 could receive marking agent cartridge identification data as a result of a host computing device that is connected such printer, e.g., via a USB connection, having sent the identification data to system 102 via an internet. For instance, the host computing device that is connected to the printer may include an agent component for system 102, the agent component to enable communication of the identification data from the host computing device to system 102.

System 102 causes the identification data 412 to be stored at a database 414 in association with a fleet identifier 416 for the printer fleet 410. In examples, the fleet identifier 416 may be or otherwise include an identifier for an owner of the printer fleet 410, a lessee of the printer fleet 410, or a customer that is purchasing printer services with respect to the first printer fleet 410. In another example, database 414 may include other identification data that is for printer fleets other than the printer fleet 410. In another example, database 414 may include identification data for a single fleet, e.g., printer fleet 410. In another example, the identification data 412 for the printer fleet 410 may be caused to be stored within a document that includes identification data for one printer fleet.

Continuing at FIG. 4, internet-connected printer one 404, e.g., responsive to a user 420 at printer one 404 having installed or attempted to install a first marking agent cartridge 422, makes a first determination, by accessing a list of marking agent cartridges known to have been previously used or to have been remanufactured, that the first marking agent cartridge 422 is a remanufactured cartridge. To confirm this first determination prior to causing display of a remanufactured cartridge warning, printer one 404 sends to system 102, via internet 116, a request 426 for fleet installation information with respect to the first marking agent cartridge 422.

System 102, responsive to receipt of the fleet installation information request 426 sent by printer one 404, may access the identification data 412 stored at database 414 and make a second determination 428 as to whether or not the first marking agent cartridge 422 was previously installed in another printer of the printer fleet 410 based upon the identification data 412. System 102 in turn will send fleet data 432 indicative of the second determination 428 to printer one 404 that sent the request 426. Printer one 404 receives from system 102 the fleet data 432 indicative of the second determination 428.

In an example wherein the fleet data 432 is indicative of a second determination 428 that the first marking agent cartridge 422 was previously installed at a printer of the printer fleet 410, printer one 404 may cause a user warning 430 that was to be provided at printer one 404 as a result of the first determination, to be reversed, cancelled, or overridden. In examples, the user warning 430 that is reversed, cancelled or overridden may be a warning that the first marking agent cartridge is a remanufactured cartridge, a warning that the marking agent cartridge is a remanufactured cartridge, a warning that a printer user may experience decreased print quality as a result of installation or use of the first marking agent cartridge, or a warning that a printer user may experience erroneous information regarding remaining marking agent levels as a result of installation or use of the first marking agent cartridge.

In another example wherein the fleet data 432 is indicative of a second determination 428 that first marking agent cartridge 422 was not previously installed at a printer of the printer fleet 410, printer one 404 may utilize the second determination 428 as confirmation of the first determination, and may proceed to cause a user warning 430 to be displayed at a display component 424 at printer one 404. As used herein, "display" refers generally to exhibition or presentation caused by a computer for the purpose of perception by a user via an electronic display component. In examples, a display may be a display to be presented at a computer monitor, touchscreen, projection device, or other electronic display component. As used herein, a "display component" refers generally to a combination of hardware and programming to exhibit or present content, a message, or other information for perception by a user, and can include, but is not limited to, a visual, tactile or auditory display. In examples, the display may include a graphic user interface to enable user interaction with the display.

Figure 5:
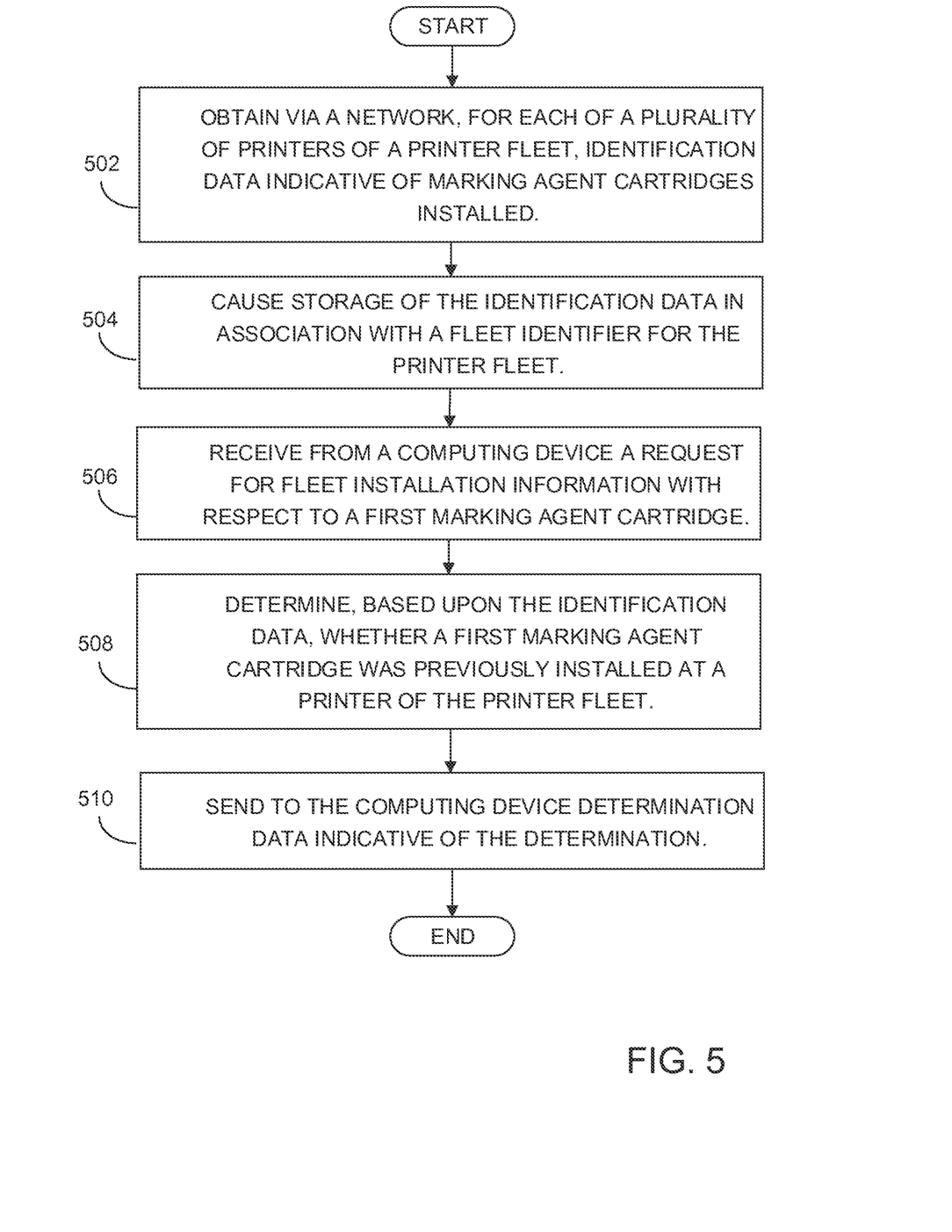
FIG. 5 is a flow diagram depicting implementation of an example of a method for determining previous installations of marking agent cartridges at a printer of a printer fleet.

Operation: FIG. 5 is a flow diagram of implementation of a method for determining previous installations of marking agent cartridges at a printer of a printer fleet. In discussing FIG. 5, reference may be made to the components depicted in FIGS. 2A and 3A. Such reference is made to provide contextual examples and not to limit the manner in which the method depicted by FIG. 5 may be implemented. For each of a plurality of printers of a printer fleet, identification data indicative of marking agent cartridges installed is obtained via a network (block 502). Referring back to FIGS. 2A and 3A, acquisition engine 202 (FIG. 2A) or acquisition module 302 (FIG. 3A), when executed by processing resource 340, may be responsible for implementing block 502.

The identification data is caused to be stored in association with a fleet identifier for the printer fleet (block 504). Referring back to FIGS. 2A and 3A, storage engine 204 (FIG. 2A) or storage module 304 (FIG. 3A), when executed by processing resource 340, may be responsible for implementing block 504.

A request for fleet installation information with respect to a first marking agent cartridge is received from a computing device (block 506). Referring back to FIGS. 2A and 3A, request engine 206 (FIG. 2A) or request module 306 (FIG. 3A), when executed by processing resource 340, may be responsible for implementing block 506.

It is determined, based upon the identification data, whether a first marking agent cartridge was previously installed at a printer of the printer fleet (block 508). Referring back to FIGS. 2A and 3A, determination engine 208 (FIG. 2A) or determination module 308 (FIG. 3A), when executed by processing resource 340, may be responsible for implementing block 508.

Determination data indicative of the determination is sent to the computing device (block 510). Referring back to FIGS. 2A and 3A, send engine 210 (FIG. 2A) or send module 310 (FIG. 3A), when executed by processing resource 340, may be responsible for implementing block 510.

Figure 6:
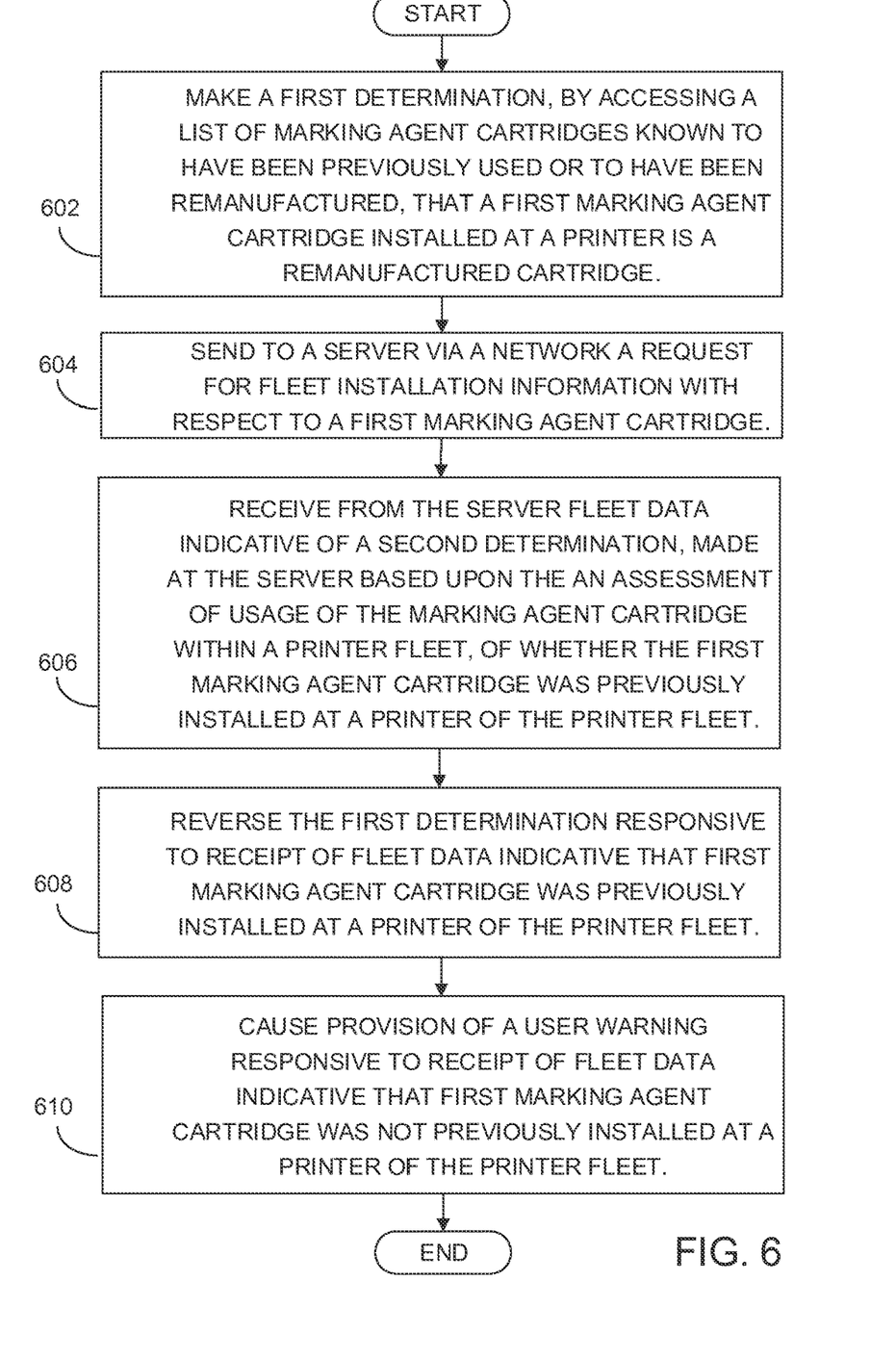
FIG. 6 is a flow diagram depicting implementation of an example of a method to determine previous installations of marking agent cartridges at a printer of a printer fleet.

FIG. 6 is a flow diagram of implementation of a for determining previous installations of marking agent cartridges at a printer of a printer fleet, including sending determination data to a computing device to reverse a conclusion that a marking agent cartridge is a remanufactured marking agent cartridge. In discussing FIG. 6, reference may be made to the components depicted in FIGS. 2B and 3B. Such reference is made to provide contextual examples and not to limit the manner in which the method depicted by FIG. 6 may be implemented. A first determination is made that a first marking agent cartridge installed at a printer is a remanufactured cartridge. The determination is made by accessing a list of marking agent cartridges known to have been previously used or to have been remanufactured (block 602).

Referring back to FIGS. 2B and 3B, determination engine 212 (FIG. 2B) or determination module 312 (FIG. 3B), when executed by processing resource 340, may be responsible for implementing block 602.

A request for fleet installation information with respect to a first marking agent cartridge is sent to a server via a network (block 604). Referring back to FIGS. 2B and 3B, request engine 214 (FIG. 2B) or request module 314 (FIG. 3B), when executed by processing resource 340, may be responsible for implementing block 604.

Fleet data indicative of a second determination of whether the first marking agent cartridge was previously installed at a printer of the printer fleet is received from the server. The second determination was made at the server based upon an assessment of usage of the marking agent cartridge within a printer fleet (block 606). Referring back to FIGS. 2B and 3B, receipt engine 216 (FIG. 2B) or receipt module 316 (FIG. 3B), when executed by processing resource 340, may be responsible for implementing block 606.

The first determination is to be reversed responsive to receipt of fleet data indicative that first marking agent cartridge was previously installed at a printer of the printer fleet (block 608). Referring back to FIGS. 2B and 3B, reversal engine 218 (FIG. 2B) or reversal module 318 (FIG. 3B), when executed by processing resource 340, may be responsible for implementing block 606.

A user warning is caused to be provided responsive to receipt of fleet data indicative that first marking agent cartridge was not previously installed at a printer of the printer fleet (block 610). Referring back to FIGS. 2B and 3B, warning engine 220 (FIG. 2B) or warning module 320 (FIG. 3B), when executed by processing resource 340, may be responsible for implementing block 606.

Figure 7:
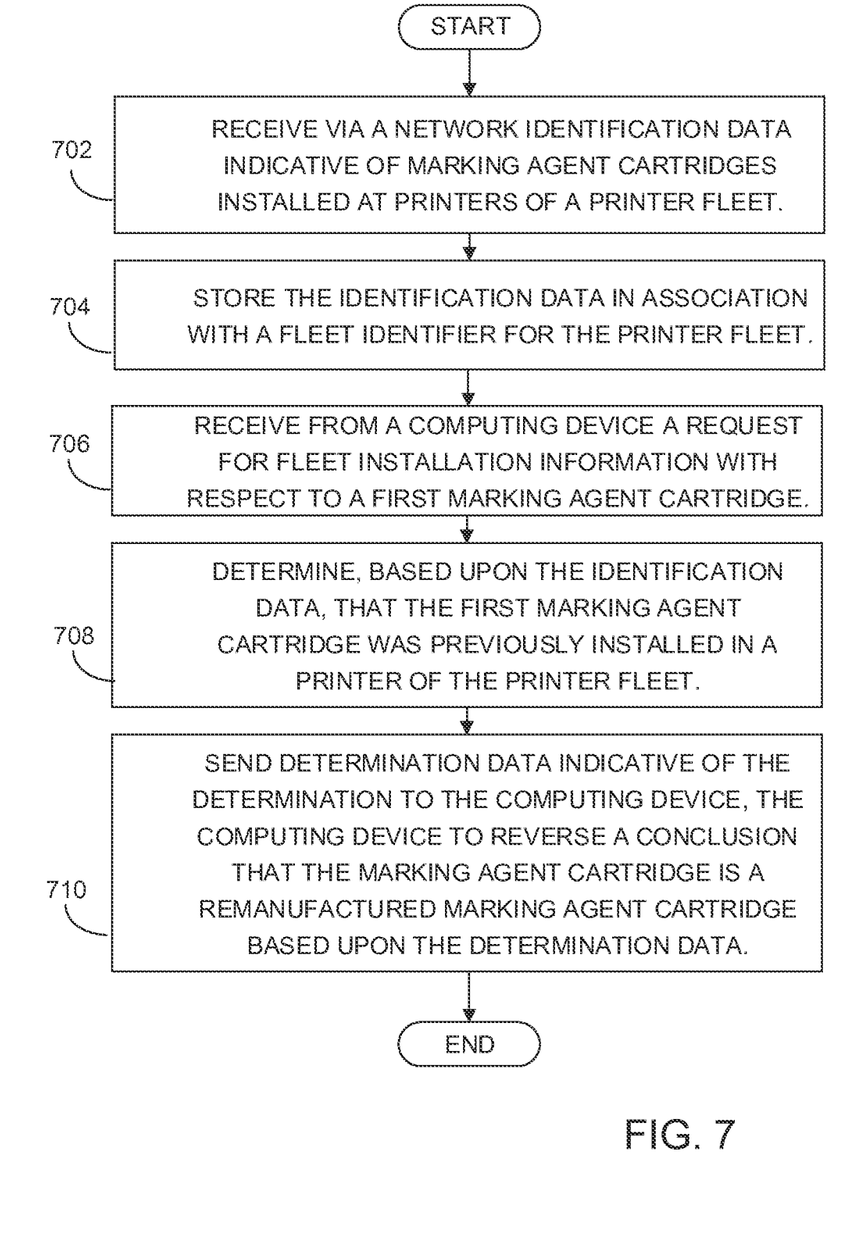
FIG. 7 is a flow diagram depicting implementation of an example of a method for determining previous installations of marking agent cartridges at a printer of a printer fleet, including sending determination data to a computing device to reverse a conclusion that a marking agent cartridge is a remanufactured marking agent cartridge.

FIG. 7 is a flow diagram of implementation of a method to determine previous installations of marking agent cartridges at a printer of a printer fleet. In discussing FIG. 7, reference may be made to the components depicted in FIGS. 2A and 3A. Such reference is made to provide contextual examples and not to limit the manner in which the method depicted by FIG. 7 may be implemented. Identification data indicative of marking agent cartridges installed at printers of a printer fleet is received via a network (block 702). Referring back to FIGS. 2A and 3A, acquisition engine 202 (FIG. 2A) or acquisition module 302 (FIG. 3A), when executed by processing resource 340, may be responsible for implementing block 702.

The identification data is stored in association with a fleet identifier for the printer fleet (block 704). Referring back to FIGS. 2A and 3A, storage engine 204 (FIG. 2A) or storage module 304 (FIG. 3A), when executed by processing resource 340, may be responsible for implementing block 704.

A request for fleet installation information with respect to a first marking agent cartridge is received from a computing device (block 706). Referring back to FIGS. 2A and 3A, request engine 206 (FIG. 2A) or request module 306 (FIG. 3A), when executed by processing resource 340, may be responsible for implementing block 706.

It is determined, based upon the identification data, that the first marking agent cartridge was previously installed in a printer of the printer fleet (block 708). Referring back to FIGS. 2A and 3A, determination engine 208 (FIG. 2A) or determination module 308 (FIG. 3A), when executed by processing resource 340, may be responsible for implementing block 708.

Determination data, indicative of the determination, is sent to the computing device. The computing device is to reverse a conclusion that the marking agent cartridge is a remanufactured marking agent cartridge based upon the determination data (block 710). Referring back to FIGS. 2A and 3A, send engine 210 (FIG. 2A) or send module 310 (FIG. 3A), when executed by processing resource 340, may be responsible for implementing block 710.

Conclusion: FIGS. 1-7 aid in depicting the architecture, functionality, and operation of various examples. In particular, FIGS. 1, 2A, 2B, 3A, and 3B depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 5-7 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:

1. A system, comprising:
    an acquisition engine in a server to obtain via a network, for each of a plurality of printers of a printer fleet, identification data indicative of marking agent cartridges installed in the printers of the fleet;
    a storage engine to cause storage of the identification data in association with a fleet identifier for the printer fleet;
    a request engine in the server to receive via the network, from a computing device associated with a particular printer in the printer fleet, at least one request for fleet installation information with respect to a marking agent cartridge in the particular printer;
    a determination engine in the server to determine the fleet installation information based upon the received identification data, the fleet installation information specifying whether the marking agent cartridge was previously installed at any printer of the printer fleet; and
    a send engine in the server to send the determined fleet installation information to the computing device in response to each request.

2. The system of claim 1, wherein the determination is that the marking agent cartridge was previously installed in a printer of the printer fleet, and the fleet installation information is provided to the computing device to override a prior determination by the computing device, made prior to the request for the fleet installation information, that the marking agent cartridge is a remanufactured marking agent cartridge.

3. The system of claim 1, wherein the determination is that the marking agent cartridge was not previously installed in a printer of the printer fleet, and the fleet installation information is provided to the computing device to confirm a prior determination by the computing device, made prior to the request for the fleet installation information, that the marking agent cartridge is a remanufactured marking agent cartridge.

4. The system of claim 1, wherein the fleet identifier includes an identification of at least one of a fleet owner, a fleet lessee, a fleet licensee, and a fleet customer.

5. The system of claim 1, wherein causing storage of the identification data in association with a fleet identifier for the printer fleet includes storing the identification data in a document that includes identification data for the printer fleet.

6. The system of claim 1, wherein causing storage of the identification data in association with a fleet identifier for the printer fleet includes storing the identification data in association with an identifier for the printer fleet in a database, the database including identification data for a plurality of printer fleets.

7. The system of claim 1, wherein the computing device is the printer of the printer fleet.

8. The system of claim 1, wherein the printer is a first printer, and the computing device is a host computing device for a second printer of the printer fleet, the second printer connected to the host computing device via a wired connection.

9. The system of claim 8, wherein the host computing device includes an agent component for the acquisition engine, the agent component to facilitate communication of the identification data from the host computing device to the acquisition engine.

10. The system of claim 1, wherein the acquisition engine is to obtain the identification data from at least one of the plurality of printers of the printer fleet via the network.

11. The system of claim 1, wherein the acquisition engine, the storage engine, the request engine, the determination engine, and the send engine are included within a cloud computing device that is connected to the computing device via an internet.

12. The system of claim 1, wherein the acquisition engine, the storage engine, the request engine, the determination engine, and the send engine are included within a print server device that is part of a network that is not an internet and that includes the computing device.

13. A system to determine previous installations of marking agent cartridges within a printer fleet, comprising:
    a determination engine, to make a first determination, by accessing a list of marking agent cartridges known to have been previously used or to have been remanufactured, that a first marking agent cartridge installed at a printer is a remanufactured cartridge;
    a request engine, to send to a server via a network a request for fleet installation information with respect to a first marking agent cartridge;
    a receipt engine, to receive from the server fleet data indicative of a second determination, made at the server based upon the an assessment of usage of the marking agent cartridge within a printer fleet, of whether the first marking agent cartridge was previously installed at a printer of the printer fleet; and a reversal engine, to reverse the first determination responsive to receipt of fleet data indicative that first marking agent cartridge was previously installed at a printer of the printer fleet; and a warning engine, cause provision of a user warning responsive to receipt of fleet data indicative that first marking agent cartridge was not previously installed at a printer of the printer fleet.

14. The system of claim 13, wherein the computing device is a printer.

15. A method to determine previous installations of marking agent cartridges within a printer of a printer fleet, comprising:

receiving via a network identification data indicative of marking agent cartridges installed at printers of a printer fleet;

storing the identification data in association with a fleet identifier for the printer fleet;

receiving from a computing device a request for fleet installation information with respect to a first marking agent cartridge;

determining, based upon the identification data, that the first marking agent cartridge was previously installed in a printer of the printer fleet; and sending determination data indicative of the determination to the computing device, the computing device to reverse a conclusion that the marking agent cartridge is a remanufactured marking agent cartridge based upon the determination data.

\* \* \* \* \*

UNITED STATES PATENT AND TRADEMARK OFFICE
CERTIFICATE OF CORRECTION

PATENT NO. : 10,430,127 B2  
APPLICATION NO. : 15/757053  
DATED : October 1, 2019  
INVENTOR(S) : Shell S Simpson et al.

It is certified that error appears in the above-identified patent and that said Letters Patent is hereby corrected as shown below:

In the Drawings

In sheet 6 of 7, reference numeral 606, Line 3, delete "THE AN" and insert -- THE --, therefor.

In the Claims

In Column 14, Line 64, in Claim 13, delete "the an" and insert -- the --, therefor.

Signed and Sealed this
Seventeenth Day of March, 2020

Andrei Iancu
*Director of the United States Patent and Trademark Office*